United States Patent [19]

Waters

[11] 4,202,061
[45] May 13, 1980

[54] LAVATORY WASTEWATER DISPOSAL SYSTEM FOR AIRCRAFT

[75] Inventor: Kenneth L. Waters, Federal Way, Wash.

[73] Assignee: The Boeing Company, Seattle, Wash.

[21] Appl. No.: 974,365

[22] Filed: Dec. 29, 1978

[51] Int. Cl.² ............................................. E03D 5/016
[52] U.S. Cl. ........................................ 4/317; 4/300; 4/321; 4/316; 137/814; 137/805
[58] Field of Search .................. 4/300, 312, 316, 317, 4/318, 319, 323, 432, 114, 187 R, 166, 167, 9; 137/814, 804, 805, 78, 806; 210/68, 167, 152

[56] References Cited

U.S. PATENT DOCUMENTS

| | | | |
|---|---|---|---|
| 700,719 | 5/1902 | Allen et al. ............................... | 4/323 |
| 1,996,325 | 4/1935 | Cox ........................................... | 4/114 |
| 2,119,328 | 5/1938 | Haberlin .................................. | 4/432 |
| 2,565,720 | 8/1951 | Collison et al. .......................... | 4/114 |
| 3,079,612 | 3/1963 | Corliss ..................................... | 4/317 |
| 3,183,525 | 5/1965 | O'Brien et al. .......................... | 4/321 R |
| 3,406,951 | 10/1968 | Marks ...................................... | 137/805 X |
| 3,477,699 | 11/1969 | Drayer ..................................... | 137/805 X |
| 3,504,381 | 4/1970 | Dewey ...................................... | 4/321 |
| 3,535,712 | 10/1970 | Zeff et al. ................................ | 4/317 |
| 3,833,943 | 9/1974 | Sturtevant ............................... | 4/114 X |
| 3,922,730 | 12/1975 | Kemper ................................... | 4/318 X |
| 3,927,425 | 12/1975 | Delaney et al. ......................... | 4/317 |
| 3,936,888 | 2/1976 | Sturtevant ............................... | 4/114 X |
| 3,958,279 | 5/1976 | Bogusz .................................... | 4/317 |
| 4,017,395 | 4/1977 | Davis ....................................... | 4/317 X |
| 4,069,521 | 1/1978 | Aleman ................................... | 4/300 |
| 4,070,714 | 1/1978 | Bishton, Jr. et al. .................... | 4/318 |

*Primary Examiner*—Henry K. Artis

[57] ABSTRACT

In an airplane having a pressurized passenger section, with a lavatory sink. The waste water from the lavatory sink is directed either to a toilet tank where it is stored, or to a drain mast line where it is discharged overboard during in-flight operation. A particular fluidic diverting system is used so that when the pressure differential between the passenger compartment and ambient atmosphere is above a certain level, air from the passenger compartment passes through a vent line to cause the fluidic system to operate in a manner that substantially all the waste water is directed through the drain mast line.

28 Claims, 5 Drawing Figures

LAVATORY WASTEWATER DISPOSAL SYSTEM FOR AIRCRAFT

BACKGROUND OF THE INVENTION

The present invention relates to a liquid waste disposal system for aircraft which have a pressurized passenger compartment.

In a typical passenger aircraft having toilet and lavatory facilities, the waste from the toilet is stored in a tank, while the lavatory sink waste water is vented through an aft drain mast line of the airplane. The reason for this, of course, is that keeping the total weight carried by the aircraft at a minimum is a very important consideration, and a discharge of waste sink water into ambient atmosphere during flight is not objectionable.

However, this arrangement offers certain disadvantages during onground aircraft operation. During loading of passengers through an aft stairway of the aircraft on windy days, there is a possibility that passengers may be sprayed with waste water if the lavatory sink is used at that time. Also, sink waste water discharged from the aircraft could freeze and create ice on airport aprons and runways.

To solve this problem, some years ago it was suggested that a device be installed to divert all sink waste water to the toilet tank during onground operations, and to the drain mast line during inflight operation. Accordingly, a system has been installed in some aircraft where a line leading from the lavatory sink at a certain location branches into two lines, one leading to the toilet storage tank, and the other to the drainmast line. To divert the water to the drain mast line during flight, pressurized air is directed through the lavatory sink vent line. Because of the pressure differential between the aircraft cabin and the ambient atmosphere, the air passing through the vent line in a sense forces the water through the drainmast line and not to the toilet tank which is pressurized to a level above ambient pressure. However, this arrangement has not been totally satisfactory in that during flight a portion of the sink waste water still flows into the toilet tank, and with the aircraft on the ground, some of the water still is diverted into the drain mast line.

In a search of the U.S. Patent literature, a number of prior patents were disclosed. While these are not considered to be particularly relevant to the present invention, these are disclosed herein to insure that the applicant is complying with his obligation to disclose all prior art of any possible relevance to the U.S. Patent and Trademark office. These patents are as follows.

U.S. Pat. No. Re. 27,087, Binder, relates to a proportional fluid amplifier which diverts a proportion of liquid flow between separate outlet passages in response to the flow on a controlling fluid through the amplifier.

U.S. Pat. No. 700,719, Allen et al., discloses a waste disposal system for a railroad car, where there is a mechanical system for discharging the waste to an outside location, or placing the waste in a holding tank.

U.S. Pat. No. 1,227,232, McGary et al, discloses a particular toilet configuration with a holding tank.

U.S. Pat. No. 1,711,235 shows a waste disposal system adapted to be mounted in an automobile, and having a holding tank.

U.S. Pat. No. 1,996,325, Cox, shows a system where toilet waste is treated with a sterilizing agent.

U.S. Pat. No. 2,119,328, Haberlin, discloses a vehicle toilet system in which wash basin water is temporarily held for subsequent use as toilet flushing water which may be exhausted to the open atmosphere or into a holding tank.

U.S. Pat. No. 2,565,720, Collison et al, discloses a system for treating waste by means of engine exhaust.

U.S. Pat. No. 3,406,951 shows a particular arrangement of a fluid amplifier for use in a fuel system.

U.S. Pat. No. 3,477,699, Drayer, shows a fluidic device for use in a fuel system.

U.S. Pat. No. 3,833,943, Sturtevant, discloses a disposal system for use in conjunction with a high temperature heat source in which waste material is mascerated and discharged into the source of heat.

U.S. Pat. No. 3,936,888, Sturtevant, discloses a system generally similar to the Sturtevant patent noted above.

SUMMARY OF THE INVENTION

The waste liquid disposal system of the present invention is adapted for use in combination with an aircraft having a passenger compartment capable of being pressurized by a source of pressurized air, a lavatory facility having a source of waste liquid, a disposal tank to receive and store liquid, and a drainmast line to direct said liquid to an ambient location outside the aircraft.

Essentially, the waste liquid disposal system comprises a diverting apparatus to direct the liquid to the disposal tank when the compartment is at a pressure substantially equal to pressure at the ambient location outside the aircraft, and to direct the liquid to the drainmast line when pressure in the compartment is at least as high as a pre-determined pressure level above pressure at the ambient location.

The apparatus comprises inlet means having a downwardly extending rear inlet wall and downwardly extending front inlet wall, with the front and rear inlet walls defining an inlet. There is means defining a diverting chamber positioned below the inlet. There is a rear generally planar chamber wall extending downwardly from the rear inlet wall as a downward extension thereof. The chamber wall is generally vertically aligned as to have a vertical component of alignment substantially greater than a horizontal component of alignment.

There is a lip member having a lower separating edge, a rear lip surface extending downwardly from the forward inlet wall to the separating edge, and a forward lip surface extending laterally forward from the edge. A diverting wall having a diverting wall surface extends from the forward lip surface on a slant downwardly and forwardly, so as to be disposed generally oppositely to the back wall. The forward lip surface and an upward portion of the diverting wall define a recess.

There is first outlet means leading downwardly from the chamber at a lower end of the chamber back wall, and connecting to the disposal tank in a manner that liquid flowing downwardly adjacent the chamber back wall flows into the first outlet means. Additionally, there is second outlet means leading forwardly from the chamber at a location adjacent a lower end of the front chamber wall in a manner that liquid flowing downwardly adjacent the front chamber wall is able to enter the second outlet means and flow through the drainmast line.

There is vent means operatively connecting the inlet means and the first outlet means to pressurized air for the compartment. Thus, when the compartment is at the pressure substantially equal to the pressure at the ambient location (i.e. outside the aircraft), the liquid flows from the inlet means along the chamber back wall into the first outlet means. When pressure in the compartment is at least as high as the predetermined pressure level above the pressure at the ambient location (i.e. when the aircraft passenger compartment is pressurized), the liquid is caused to flow from the inlet means adjacent the chamber forward wall and through the second outlet means into the drainmast line.

In the preferred form, there are diverting chamber side walls, and a pair of fingers extending downwardly from the lip member along these side walls. These fingers extend downwardly to a location generally above the first outlet means, so that liquid flowing downwardly to the first outlet means is prevented from flowing into the second outlet means.

In the preferred configuration, the rear lip surface slants downwardly and moderately rearwardly to the lip edge. Additionally, the forward lip surface slants forwardly and upwardly from said lip edge, so that at least a portion of the recess is positioned above the lip edge.

Desirably, the rear chamber wall slants downwardly and rearwardly, with the preferred broad range being a slope of between 5° to 15° from vertical. The preferred range is 9° to 13°.

With regard to the forward chamber wall, it slants downwardly and forwardly preferably at an angle between 15° and 35° from the vertical, and more desirably between 15° and 30° from the vertical. The narrower preferred range is between 21° to 26° from the vertical.

Also, the apparatus comprises a lower forward wall means connecting a lower edge of the second outlet means to a forward edge of the first outlet means. Desirably this lower forward wall means slopes rearwardly from the second outlet means to the first outlet means.

Other features of the present invention will become apparent from the following detailed description.

DESCRIPTION OF THE PREFERRED EMBODIMENT

Figure 1:
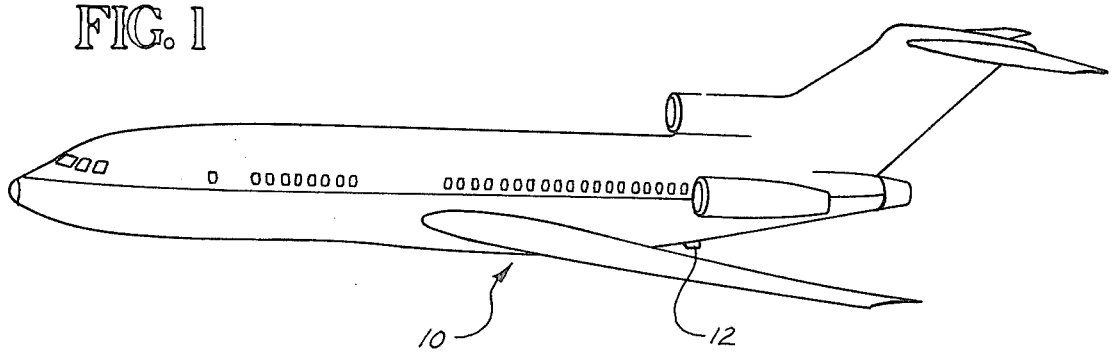
FIG. 1 is an isometric view of a passenger aircraft in which the present invention can be used, this figure illustrating a typical location of a drainmast used in the present invention.

In FIG. 1, there is shown a passenger jet aircraft 10 having an aft drain mast line 12 at the lower rear portion of the aircraft fuselage. It is through this drain line 12 that waste wash water is discharged during flight.

Figure 2:
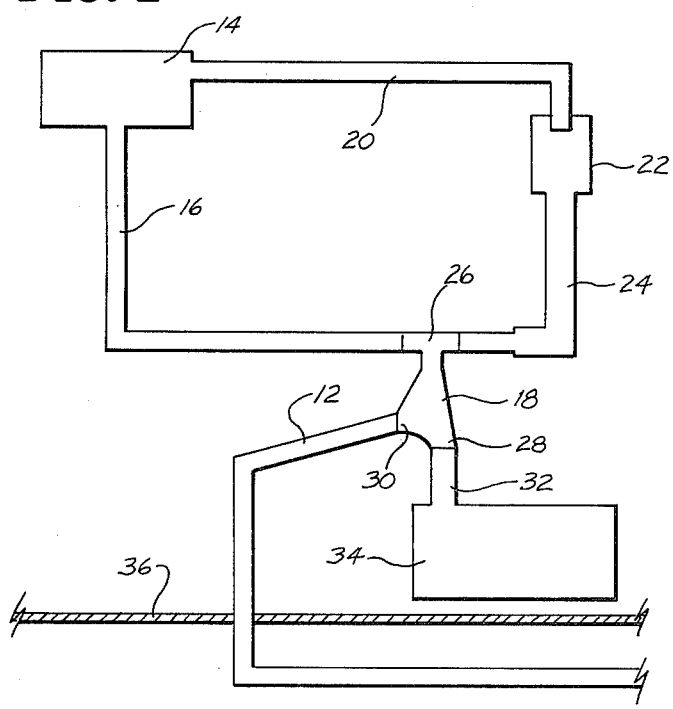
FIG. 2 is a schematic diagram of the present invention.

FIG. 2 is a schematic drawing of the present invention. There is shown a lavatory sink 14 from which waste water is discharged through a sink drain line 16 to a diverting apparatus 18. Leading from the sink 14 is an overflow line 20 which leads into a vent compartment 22, which in turn is connected through a line 24 to the diverting apparatus 18.

The diverting apparatus 18 has an upper inlet 26 end, a first lower outlet end 28, and a second lateral outlet end 30. The outlet 28 is connected through a toilet vent line 32 to a toilet tank 34. The second outlet 30 is connected to the previously mentioned drainmast line 12 which extends through the floor 36 of the aircraft and opens to ambient atmosphere.

As indicated previously herein, the apparatus of the present invention functions in a manner that when the airplane is on the ground, water that is discharged from the sink 14 (or which flows through the overflow line 20) is discharged into the toilet tank 34. When the airplane is in flight, the cabin is pressurized so that a predetermined pressure differential exists between the interior of the cabin and ambient atmosphere, and the water from the sink 14 flows into the diverting apparatus 18 and is discharged through the drainmast line 12.

Figure 3:
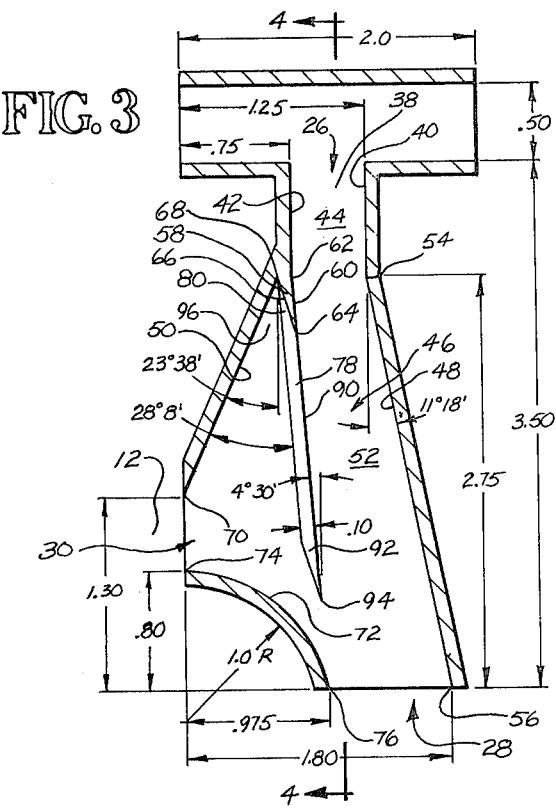
FIG. 3 is a sectional view of the diverting apparatus of the present invention.
Figure 4:
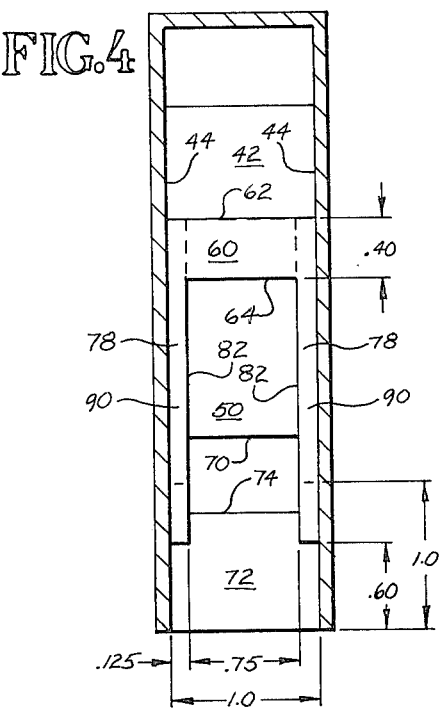
FIG. 4 is a sectional view taken along line 4—4 of FIG. 3.
Figure 5:
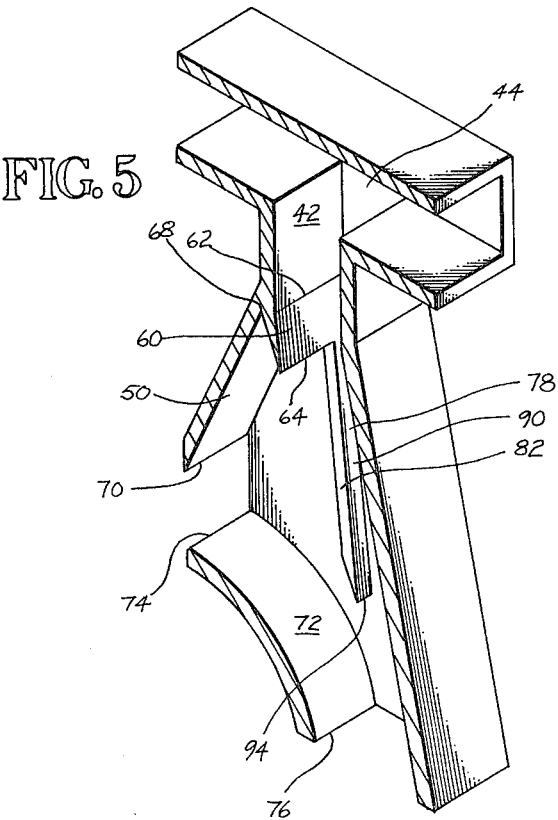
FIG. 5 is an isometric view illustrating the configuration of the diverting apparatus shown in FIGS. 3 and 4.

Attention is now directed to FIGS. 3 through 5 which disclose the details of the diverting apparatus 18. At the inlet end 26, there is an inlet passageway 38 defined by a substantially planar rear wall 40, a substantially planar forward wall 42, and two substantially planar side walls 44. The inlet passageway leads downwardly into a diverting chamber, generally designated 46. This diverting chamber 46 is defined generally by a rear planar chamber wall 48, a forward planar chamber wall 50, and two planar chamber side walls 52.

The rear chamber wall 48 has an upper edge 54 which joins to the lower edge of the rear inlet wall 40. The lower edge 56 of the rear chamber wall 48 leads to the rear side of the aforementioned toilet vent line 32. The rear chamber wall 48 slopes downwardly and rearwardly at a moderate angle from the vertical.

At the lower edge of the front inlet wall 42, there is a separating lip 58. The separating lip has a planar rear surface 60 which joins to the lower edge of the front inlet wall 42 at a juncture line 62 and extends downwardly there from a short distance to terminate in a lower separating edge 64. The lip 60 has a forward wall 66 which extends upwardly and forwardly from the edge 64 to join to an upper edge 68 of the front chamber wall 50. The lower edge 70 of the front chamber wall 50 joins to an upper side of the drain mast line 12.

At the lower forward side of the chamber 46, there is a wall 72 which extends in a 90° curve from a front edge 74 to a lower rear edge 76. The front edge 74 joins to the lower side of the drainmast line 12, while the edge 76 joins to the front side of the toilet vent line 32.

There are two fingers 78 positioned on opposite sides of the chamber 52. Each finger 78 has an upper end 80 positioned against a respective end portion of the lip 58. Each of the fingers 78 has a rear surface 80 which is a downward extension of the lip surface 60. The width dimension of each of the fingers 78 is made relatively small, so that the two inside walls 82 of the two fingers are placed a substantial distance from one another. The lower end 92 of each finger 78 ends in a relatively sharp edge 94, and is spaced a moderate distance rearwardly and upwardly of a middle portion of the surface 72.

To describe the operation of the present invention, let it be assumed the airplane 10 is on the ground so that the pressure inside the airplane fuselage is at ambient pressure. Let it further be assumed that the lavatory facilities of the airplane are being used so that there is a flow of water from the sink 14 downwardly through the line 16 and into the inlet end 26 of the diverter apparatus 18. As indicated previously herein, the desired result is that all of the water would pass into the toilet vent line 32 and thence into the toilet tank 34. (As indicated previously, if there is any flow of liquid through the drainmast line 12, this water may spray against people who would be near by, or simply be deposited on the nearby ground surface, which is a condition to be avoided.)

It will be noted that the rear chamber wall 48 slants in a downward direction moderately rearwardly, with the preferred slope being 11° 18" from the vertical. With this moderate degree of slope, the water flowing adjacent rear inlet surface 40 tends to attach itself to the wall 48 and flow downwardly directly to the toilet vent line 32. The water which flows adjacent the front inlet wall 42 passes over the rear surface 60 of the lip 58 and follows generally the main path of the water downwardly and moderately rearwardly to the toilet vent line 32. The two fingers 78 protrude inwardly to a sufficient extent so that water is prevented from attaching itself to the corner portion formed by the chamber surface 50 and lip surface 66 with the two side walls 52.

Let it now be assumed that the airplane 10 has flown up to cruise altitude so that there is a substantial pressure differential between the cabin pressure and ambient atmosphere. In this situation, fresh air is constantly being pumped into the airplane passenger section (usually by bleeding air from the compressor of one or more of the engines), and air is being continuously vented out through the line 24 and through the drainmast line 12. Also, air from the passenger compartment is vented into the toilet tank 34, and passes in turn through the toilet vent line 32 and out the drainmast line 12.

Let it further be assumed that there is water in the sink 14, and the plug in the sink 14 is open so that water passes downwardly through line 16 to the inlet 26 of the diverter apparatus 18. The higher pressure in the toilet tank 34, with the resultant flow of air through the vent line 32, tends to cause the water flowing into the inlet passageway 38 to separate from the chamber back wall 48 and move toward the chamber front wall 50. Additionally, it will be noted that the forward lip surface 68 and the upper portion of the wall 50 form a cavity 96 located upwardly and forwardly of the lip lower edge 64. As the water flows downwardly by the lip edge 64, a low pressure region is formed in the cavity 96 which further tends to draw the water forwardly toward the wall 50. At some location above lower edge 70 of the wall 50, water attachs to the wall 50 and flows downwardly to the location of the inlet of the drainmast line 12. Since the drain mast line 12 is connected to ambient atmosphere, the water flows into and through the line 12 to be discharged outboard of the aircraft 10. In this situation, the two fingers 78, having a small width dimension, do not impede the forward and downward flow of the water toward the wall 50.

The dimensions and angular relationships of the various parts of the diverting apparatus 18 are shown in FIGS. 3 and 4 and this particular configuration has been found to work quite effectively. The angular relationship of the walls 48 and 50 have been found to be critical for optimum performance. With the particular arrangement shown herein, the angle which the surface 48 makes with the vertical is desirably 11° 18", and can still perform quite well with departures of about 2° from this angle. Thus, the angle that the surface 48 makes with the vertical should desirably be between about 9° to 13°, and broadly between about 5° to 15°.

Also, the optimum angle that the forward chamber surface 50 makes with the vertical was found to be 23° 38" for this particular configuration, with angular deviations between 2° to 3° being found to be not too objectionable. Thus, the angle that the surface 50 makes with the vertical should be between 21° to 26°, and within broader limits would be between 15° and 30° to 35°.

With the particular configuration shown in FIGS. 3 and 4, it has been found that when the pressure differential between the cabin pressure and ambient atmosphere reaches that differential which would normally be expected to occur when the aircraft is at 7000 feet (i.e. a differential of PSI), substantially all the water passing in the inlet 38 is diverted into the drainmast line 12. When the two pressures are equal, substantially all the water flows into the toilet vent line 32. At pressure differentials moderately below that which is achieved at the 7000 foot level of aircraft altitude, a portion of the water flows through the drainmast line 12, and a portion flows into the toilet vent line 32.

Now therefore I claim:

1. A waste liquid disposal system for an aircraft comprising:
   a. means defining a compartment capable of being pressurized by a source of pressurized air,
   b. a source of waste liquid,
   c. a disposal tank to receive said liquid,
   d. a drainmast line to direct said liquid to an ambient location,
   e. a diverting apparatus to direct said liquid to said disposal tank when said compartment is at a pressure substantially equal to pressure at said ambient location, and to direct said liquid to said drainmast line when pressure in said compartment is at least as high as a predetermined pressure level above pressure at said ambient location, said apparatus comprising:
      1. inlet means having a downwardly extending rear inlet wall and a downwardly extending front inlet wall, said front and rear inlet walls defining an inlet,
      2. means defining a diverting chamber positioned below said inlet, said diverting means having
         a. a rear generally planar chamber wall extending downwardly from said rear inlet wall as a downward extension thereof, said rear chamber wall being generally vertically aligned so as to have a vertical component of alignment substantially greater than a horizontal component of alignment,
         b. a lip member having a lower separating edge, a rear lip surface extending downwardly from said forward inlet wall to said separating edge, and a forward lip surface extending laterally forward from said edge,
         c. a diverting wall having a diverting wall surface extending from said forward lip surface on a slant downwardly and forwardly, and disposed generally oppositely to said back wall,
         d. said forward lip surface and an upward portion of said diverting wall defining a recess,
      3. a first oulet means leading downwardly from said chamber at a lower end of said chamber back wall and connecting to said disposal tank in a manner that liquid flowing downwardly adjacent said chamber back wall flows into said first outlet means,
      4. a second outlet means leading forwardly from said chamber at a location adjacent a lower end of said front chamber wall in a manner that liquid flowing downwardly adjacent said front chamber wall is able to enter said second outlet means and flow through said drainmast line, f. vent means operatively connecting said inlet means and said first outlet means to pressurized air for said compartment, whereby when said compartment is at the pressure substantially equal to the pressure at the ambient location, said liquid flows from said inlet means along said chamber back wall into said first outlet means, and when pressure in the compartment is at least as high as said predetermined pressure level above the pressure at the ambient location, said liquid is caused to flow from the inlet means adjacent said chamber forward wall and through said second outlet means.

2. The system as recited in claim 1, wherein said diverting means further comprises side walls defining side portions of said chamber, and a pair of fingers extending downwardly from said lip member along said side walls, said fingers extending downwardly to a location generally above said first outlet means, whereby liquid flowing downwardly to said first outlet means is prevented from flowing into said second outlet means.

3. The system as recited in claim 1, wherein said rear lip surface slants downwardly and moderately rearwardly to said lip edge.

4. The system as recited in claim 3, wherein said forward lip surface slants forwardly and upwardly from said lip edge, so that at least a portion of said recess is positioned above said lip edge.

5. The system as recited in claim 1, wherein said rear chamber wall slants downwardly and rearwardly.

6. The system as recited in claim 5, wherein said rear chamber wall slants downwardly and rearwardly at an angle of 5° to 15° from vertical.

7. The system as recited in claim 5, wherein said rear chamber wall slants downwardly and rearwardly at an angle of 9° to 13° from vertical.

8. The system as recited in claim 1, wherein said forward chamber wall slants downwardly and forwardly at an angle between 15° and 35° from vertical.

9. The system as recited in claim 1, wherein said forward chamber wall slants downwardly and forwardly at an angle between 15° to 30° from vertical.

10. The system as recited in claim 1, wherein said forward chamber wall slants downwardly and forwardly at an angle between 21° to 26° from vertical.

11. The system as recited in claim 1, wherein said diverter means further comprises a lower forward wall means connecting a lower edge of said second outlet means to a forward edge of said first outlet means, said lower forward wall means sloping rearwardly from said second outlet means to said first outlet means.

12. The system as recited in claim 1, wherein:
a. said rear lip surface slants downwardly and moderately rearwardly to said lip edge,
b. said forward lip surface slants forwardly and upwardly from said lip edge, so that at least a portion of said recess is positioned above said lip edge,
c. said rear chamber wall slants downwardly and rearwardly.

13. The system as recited in claim 12, wherein:
a. said diverting means further comprises side walls defining side portions of said chamber, and a pair of fingers extending downwardly from said lip member along said side walls, said fingers extending downwardly to a location generally above said first outlet means, whereby liquid flowing downwardly to said first outlet means is prevents from flowing into said second outlet means,
b. said rear chamber wall slants downwardly and rearwardly at an angle of 5° to 15° from vertical,
c. said forward chamber wall slants downwardly and forwardly at an angle between 15° to 30° from vertical.
d. said diverter means further comprises a lower forward wall means connecting a lower edge of said second outlet means to a forward edge of said first outlet means, said lower forward wall means sloping rearwardly from said second outlet means to said first outlet means.

14. The system as recited in claim 12, wherein:
a. said diverting means further comprises side walls defining side portions of said chamber, and a pair of fingers extending downwardly from said lip member along said side walls, said fingers extending downwardly to a location generally above said first outlet means, whereby liquid flowing downwardly to said first outlet means is prevented from flowing into said second outlet means.
b. said rear lip surface slants downwardly and moderately rearwardly to said lip edge.
c. said forward lip surface slants forwardly and upwardly from said lip edge, so that at least a portion of said recess is positioned above said lip edge.
d. said rear chamer wall slants downwardly and rearwardly at an angle of 9° to 13° from vertical.
e. said forward chamber wall slants downwardly and forwardly at an angle between 20° to 26° from vertical.
f. said diverter means further comprises a lower forward wall means connecting a lower edge of said second outlet means to a forward edge of said first outlet means, said lower forward wall means sloping rearwardly from said second outlet means to said first outlet means.

15. In an aircraft having:
a. a passenger compartment capable of being pressurized by a source of pressurized air,
b. a lavatory facility having a source of waste liquid,
c. a disposal tank to receive and store liquid,
d. a drainmast line to direct said liguid to an ambient location outside the aircraft, a waste liquid disposal system comprising a diverting apparatus to direct said liquid to said disposal tank when said compartment is at a pressure substantially equal to pressure at said ambient location, and to direct said liquid to said drainmast line when pressure in said compartment is at least as high as a predetermined pressure level above pressure at said ambient location, said apparatus comprising:
a. inlet means having a downwardly extending rear inlet wall and a downwardly extending front inlet wall, said front and rear inlet walls defining an inlet,
b. means defining a diverting chamber positioned below said inlet, said diverting means having
 1. a rear generally planar chamber wall extending downwardly from said rear inlet wall as a downward extension thereof, said rear chamber wall being generally vertically aligned so as to have a vertical components of alignment substantially greater than a horizontal component of alignment,
 2. a lip member having a lower separating edge, a rear lip surface extending downwardly from said forward inlet wall to said separating edge, and a forward lip surface extending laterally forward from said edge, 3. a diverting wall having a diverting wall surface extending from said forward lip surface on a slant downwardly and forwardly, and disposed generally oppositely to said back wall, 4. said forward lip surface and an upward portion of said diverting wall defining a recess, c. a first outlet means leading downwardly from said chamber at a lower end of said chamber back wall and connecting to said disposal tank in a manner that liguid flowing downwardly adjacent said chamber back wall flows into said first outlet means, d. a second outlet means connecting to said drainmast line and leading forwardly from said chamber at a location adjacent a lower end of said front chamber wall in a manner that liquid flowing downwardly adjacent said front chamber wall is able to enter said second outlet means and flow through said drainmast line, e. vent means operatively connecting said inlet means and said first outlet means to pressurized air for said compartment, whereby when said compartment is at the pressure substantially equal to the pressure at the ambient location, said liquid flows from said inlet means along said chamber back wall into said first outlet means, and when pressure in the compartment is at least as high as said predetermined pressure level above the pressure at the ambient location, said liquid is caused to flow from the inlet means adjacent said chamber forward wall and through said second outlet means.

16. The system as recited in claim 15, wherein said diverting means further comprises side walls defining side portions of said chamber, and a pair of fingers extending downwardly from said lip member along said side walls, said fingers extending downwardly to a location generally above said first outlet means, whereby liquid flowing downwardly to said first outlet means is prevented from flowing into said second outlet means.

17. The system as recited in claim 15, wherein said rear lip surface slants downardly and moderately rearwardly to said lip edge.

18. The system as recited in claim 17, wherein said forward lip surface slants forwardly and upwardly from said lip edge, so that at least a portion of said recess is positioned above said lip edge.

19. The system as recited in claim 15, wherein said rear chamber wall slants downwardly and rearwardly.

20. The system as recited in claim 19, wherein said rear chamber wall slants downwardly and rearwardly at an angle of 5° to 15° from vertical.

21. The system as recited in claim 19, wherein said rear chamber wall slants downwardly and rearwardly at an angle of 9° to 13° from vertical.

22. The system as recited in claim 15, wherein said forward chamber wall slants downwardly and forwardly at an angle between 15° and 35° from vertical.

23. The system as recited in claim 15, wherein said forward chamber wall slants downwardly and forwardly at an angle between 15° to 30° from vertical.

24. The system as recited in claim 15, wherein said forward chamber wall slants downardly and forwardly at an angle between 21° to 26° from vertical.

25. The system as recited in claim 15, wherein said diverter means further comprises a lower forward wall means connecting a lower edge of said second outlet means to a forward edge of said first outlet means, said lower forward wall means sloping rearwardly from said second outlet means to said first outlet means.

26. The system as recited in claim 15, wherein:
a. said rear lip surface slants downwardly and moderately rearwardly to said lip edge,
b. said forward lip surface slants forwardly and upwardly from said lip edge, so that at least a portion of said recess is positioned above said lip edge,
c. said rear chamber wall slants downwardly and rearwardly.

27. The system as recited in claim 15, wherein:
a. said diverting means further comprises side walls defining side portions of said chamber, and a pair of fingers extending downwardly from said lip member along said side walls, said fingers extending downwardly to a location generally above said first outlet means, whereby liquid flowing downwardly to said first outlet means is prevented from flowing into said second outlet means,
b. said rear chamber wall slants downwardly and rearwardly at an angle of 5° to 15° from vertical,
c. said forward chamber wall slants downwardly and forwardly at an angle between 15° to 30° from vertical.
d. said diverter means further comprises a lower forward wall means connecting a lower edge of said second outlet means, to a forward edge of said first outlet means, said lower forward walls means sloping rearwardly from said second outlet means to said first outlet means.

28. The system as recited in claim 15, wherein:
a. said diverting means further comprises side walls defining side portions of said chamber, and a pair of fingers extending downwardly from said lip member along said side walls, said fingers extending downwardly to a location generally above said first outlet means, whereby liquid flowing downwardly to said first outlet means is prevented from flowing into said second outlet means.
b. said rear lip surface slants downwardly and moderately rearwardly to said lip edge.
c. said forward lip surface slants forwardly and upwardly from said lip edge, so that at least a portion of said recess is positioned above said lip edge.
d. said rear chamber wall slants downwardly and rearwardly at an angle of 9° to 13° from vertical.
e. said forward chamber wall slants downwardly and forwardly at an angle between 20° to 26° from vertical.
f. said diverter means further comprises a lower forward wall means connecting a lower edge of said second outlet means to a forward edge of said first outlet means, said lower forward wall means sloping rearwardly from said second outlet means to said first outlet means.

* * * * *